United States Patent
Chu et al.

(10) Patent No.: US 11,343,026 B1
(45) Date of Patent: May 24, 2022

(54) HYBRID ARQ MAC SUPPORT IN WLAN DEVICES

(71) Applicant: NXP USA, Inc., Austin, TX (US)

(72) Inventors: Liwen Chu, San Ramon, CA (US); Rui Cao, Fremont, CA (US); Hongyuan Zhang, Fremont, CA (US); Hui-Ling Lou, Sunnyvale, CA (US); Yan Zhang, Palo Alto, CA (US)

(73) Assignee: NXP USA, Inc., Austin, TX (US)

( * ) Notice: Subject to any disclaimer, the term of this patent is extended or adjusted under 35 U.S.C. 154(b) by 16 days.

(21) Appl. No.: 16/689,107

(22) Filed: Nov. 20, 2019

Related U.S. Application Data

(60) Provisional application No. 62/775,749, filed on Dec. 5, 2018.

(51) Int. Cl.
*H04W 84/12* (2009.01)
*H04L 1/18* (2006.01)

(52) U.S. Cl.
CPC .......... *H04L 1/1835* (2013.01); *H04L 1/1816* (2013.01); *H04L 1/1861* (2013.01); *H04L 1/1874* (2013.01); *H04L 1/1893* (2013.01); *H04W 84/12* (2013.01)

(58) Field of Classification Search
CPC ... H04L 1/1835; H04L 1/1861; H04L 1/1893; H04L 1/1874; H04L 1/1816; H04W 84/12
See application file for complete search history.

(56) References Cited

U.S. PATENT DOCUMENTS

| | | | |
|---|---|---|---|
| 9,876,614 B1 * | 1/2018 | Sun ...................... | H04L 1/1685 |
| 10,135,582 B1 | 11/2018 | Sun et al. | |
| 2014/0016567 A1 * | 1/2014 | Lu .......................... | H04W 72/12 370/329 |
| 2014/0198692 A1 * | 7/2014 | Torab Jahromi ...... | H04W 74/04 370/310 |
| 2015/0016360 A1 | 1/2015 | Merlin et al. | |
| 2016/0380727 A1 * | 12/2016 | Ryu ......................... | H04L 1/18 370/245 |
| 2019/0364492 A1 * | 11/2019 | Azizi ................ | H04W 52/0264 |
| 2020/0145139 A1 * | 5/2020 | Merlin .................... | H04W 4/80 |
| 2020/0280399 A1 * | 9/2020 | Kim ....................... | H04L 1/1819 |
| 2020/0396025 A1 * | 12/2020 | Sun ....................... | H04L 1/1664 |
| 2020/0404548 A1 * | 12/2020 | Tomici ................... | H04W 8/04 |

OTHER PUBLICATIONS

Merlin et al., Nov. 2018, U.S. Appl. No. 62/775,749 , pp. 1-31.*
(Continued)

*Primary Examiner* — Lakeram Jangbahadur

(57) ABSTRACT

A method for Wireless Local-Area Network (WLAN) communication in a WLAN device includes receiving from a remote WLAN device an announcement of a maximal Hybrid Automatic Repeat Request (HARQ) buffering capability of a receiver of the remote WLAN device. A HARQ Physical-layer Protocol Data Unit (HARQ PPDU), which includes one or more HARQ coding units, is constructed in the WLAN device in response to the announcement. The HARQ PPDU is transmitted from the WLAN device to the remote WLAN device. One or more of the HARQ coding units are retransmitted in response to a request from the remote WLAN device.

25 Claims, 5 Drawing Sheets

(56) References Cited

OTHER PUBLICATIONS

IEEE Draft Standard P802.11ax D4.0, "IEEE Draft Standard for Information Technology—Telecommunications and Information Exchange Between Systems; Local and Metropolitan Area Networks—Specific Requirements Part 11: Wireless LAN Medium Access Control (MAC) and Physical Layer (PHY) Specifications Amendment Enhancements for High Efficiency WLAN", section 27.3.11.4 (pp. 581), Feb. 2019.
International Application # PCT/IB2019/058159 search report dated Dec. 10, 2019.
802.11 REVmd D2.1, "IEEE Draft Standard for Information Technology—Telecommunications and Information Exchange Between Systems; Local and Metropolitan Area Networks—Specific Requirements—Part 11: Wireless LAN Medium Access Control (MAC) and Physical Layer (PHY) Specifications", section 6.3.27 (pp. 440-448), section 17.3.3.5.5 (pp. 2907-2909), Feb. 2019.
Zhang et al., U.S. Appl. No. 16/583,295, filed Sep. 26, 2019.
Zhang et al., U.S. Appl. No. 16/667,521, filed Oct. 29, 2019.
Zhang et al., U.S. Appl. No. 16/667,534, filed Oct. 29, 2019.

* cited by examiner

US 11,343,026 B1

HYBRID ARQ MAC SUPPORT IN WLAN DEVICES

CROSS-REFERENCE TO RELATED APPLICATIONS

This application claims the benefit of U.S. Provisional Patent Application 62/775,749, filed Dec. 5, 2018, whose disclosure is incorporated herein by reference.

FIELD OF THE DISCLOSURE

The present disclosure relates generally to Wireless Local-Area Networks (WLAN), and particularly to Hybrid Automatic Repeat Request (HARQ) in WLAN devices.

BACKGROUND

Various communication systems use Automatic Repeat Request (ARQ) schemes for data retransmission. ARQ and Block Acknowledgement (BA) mechanisms for Wireless Local-Area Networks (WLANs) are specified, for example, in IEEE Draft Standard 802.11 REVmd D2.1, entitled "IEEE Draft Standard for Information Technology—Telecommunications and Information Exchange Between Systems; Local and Metropolitan Area Networks—Specific Requirements—Part 11: Wireless LAN Medium Access Control (MAC) and Physical Layer (PHY) Specifications," February, 2019, e.g., in section 6.3.27.

U.S. Pat. No. 9,876,614 describes Hybrid ARQ (HARQ) schemes for WLAN. A method for transmission of media access control (MAC) protocol data units (MPDUs) over a WLAN communication channel is described. A first PHY data unit is generated at a first communication device and transmitted. The first PHY data unit has a data field that includes a first MPDU to be transmitted to a second communication device, and a PHY signal field that includes a transmission version field set to indicate an initial transmission of the first MPDU. In response to determining that a first acknowledgment has not been received, a second PHY data unit is generated at the first communication device and transmitted. The second PHY data unit has a data field that includes the first MPDU, and a PHY signal field that includes a transmission version field set to indicate a retransmission of the first MPDU.

The description above is presented as a general overview of related art in this field and should not be construed as an admission that any of the information it contains constitutes prior art against the present patent application.

SUMMARY

An embodiment that is described herein provides a method for Wireless Local-Area Network (WLAN) communication in a WLAN device. The method includes receiving from a remote WLAN device an announcement of a maximal Hybrid Automatic Repeat Request (HARQ) buffering capability of a receiver of the remote WLAN device. A HARQ Physical-layer Protocol Data Unit (HARQ PPDU), which includes one or more HARQ coding units, is constructed in the WLAN device in response to the announcement. The HARQ PPDU is transmitted from the WLAN device to the remote WLAN device. One or more of the HARQ coding units are retransmitted in response to a request from the remote WLAN device.

In an embodiment, constructing the HARQ PPDU includes setting a size of the HARQ PPDU to not exceed the maximal HARQ buffering capability announced by the remote WLAN device.

In some embodiments, constructing the HARQ PPDU includes segmenting the HARQ PPDU into multiple HARQ coding units by a Medium Access Control (MAC) process in the WLAN device. In an example embodiment, constructing the HARQ PPDU includes embedding in the HARQ coding units one or more MAC Protocol Data Unit (MPDU) delimiters for satisfying a minimum time spacing requirement between adjacent MPDUs.

In other embodiments, constructing the HARQ PPDU includes segmenting the HARQ PPDU into multiple HARQ coding units by a Physical-layer (PHY) process in the WLAN device. In an example embodiment, constructing the HARQ PPDU includes, when first and second adjacent MAC Protocol Data Units (MPDUs) in the HARQ PPDU violate a minimum time spacing requirement between adjacent MPDUs, inserting at least an additional HARQ coding unit between the first and second MPDUs. In an embodiment the method further includes, when first and second adjacent MAC Protocol Data Units (MPDUs) in the HARQ PPDU violate a minimum time spacing requirement between adjacent MPDUs, requesting the receiver of the remote WLAN device to discard buffered data relating to the second MPDU.

In a disclosed embodiment, receiving the announcement of the maximal HARQ buffering capability is performed as part of an association process of the remote WLAN device with the WLAN device. Additionally or alternatively, receiving the announcement of the maximal HARQ buffering capability is performed as part of establishing a HARQ session between the WLAN device and the remote WLAN device.

In yet another embodiment, constructing the HARQ PPDU includes embedding in the HARQ coding units of the HARQ PPDU only MPDUs sharing a common Traffic Identifier (TID). In still another embodiment, constructing the HARQ PPDU includes setting a number of the HARQ coding units in the HARQ PPDU to deliberately exceed the maximal HARQ buffering capability announced by the remote WLAN device.

In a disclosed embodiment, constructing the HARQ PPDU includes assigning a respective identifier for each of the HARQ coding units in the HARQ PPDU, and receiving the request includes receiving a list of one or more identifiers, and retransmitting the HARQ coding units includes retransmitting the one or more of the HARQ coding units associated with the identifiers listed in the request. In an alternative embodiment, receiving the request includes receiving attributes of one or more of the HARQ coding units, and retransmitting the HARQ coding units includes retransmitting the one or more of the HARQ coding units having attributes that match the request.

In some embodiments, transmitting the HARQ PPDU, and retransmitting the one or more of the HARQ coding units, are performed in a same transmission opportunity (TXOP). In an embodiment, retransmitting a HARQ coding unit includes giving precedence to retransmission of the HARQ coding unit over transmission of one or more other HARQ coding units having higher-priority Quality-of-Service (QoS) Access Categories (ACs) than the retransmitted HARQ coding unit.

In another embodiment, transmission of the HARQ PPDU, or retransmission of the one or more of the HARQ coding units, is triggered by and synchronized to a trigger frame received from the remote WLAN device. In yet another embodiment, constructing the HARQ PPDU and retransmitting the HARQ coding units includes setting a control field to have a same value in an original transmission of a HARQ coding unit and in a retransmission of the HARQ coding unit. In an embodiment the control field includes one or more of (i) a Quality-of-Service (QoS) control field and (ii) a High-Throughput (HT) control field.

There is additionally provided, in accordance with an embodiment that is described herein, a method for Wireless Local-Area Network (WLAN) communication in a WLAN device. The method includes transmitting from the WLAN device an announcement of a maximal Hybrid Automatic Repeat Request (HARQ) buffering capability of a HARQ buffer in the WLAN device. One or more HARQ Physical-layer Protocol Data Units (HARQ PPDUs), which have been constructed responsively to the announcement, are received from one or more remote WLAN devices. Each HARQ PPDU includes one or more HARQ coding units. Soft-decoding metrics are computed in the WLAN device for the received HARQ coding units, and the soft-decoding metrics are buffered in the HARQ buffer. Upon failing to decode a HARQ coding unit using the buffered soft-decoding metrics, a remote WLAN device that transmitted the HARQ coding unit is requested to retransmit the HARQ coding unit, the soft-decoding metrics for the retransmitted HARQ coding unit are re-computed, and the HARQ coding unit are re-decoded based jointly on the buffered soft-decoding metrics and the re-computed soft-decoding metrics.

In some embodiments, the method further includes reserving, in the HARQ buffer, the announced HARQ buffering capability per each of the one or more remote WLAN devices. In other embodiments the method further includes reserving in the HARQ buffer a reduced HARQ buffering capability, which is less than the announced HARQ buffering capability per each of the one or more remote WLAN devices, and receiving the HARQ PPDUs includes discarding from the HARQ buffer the soft-decoding metrics of a first HARQ coding unit in favor of the soft-decoding metrics of a second HARQ coding unit.

In an embodiment, receiving the HARQ PPDUs includes receiving each of the HARQ coding units with a respective identifier, receiving the request includes receiving a list of one or more identifiers, and requesting the remote WLAN device to retransmit the HARQ coding unit includes indicating an identifier of the HARQ coding unit to the remote WLAN device. In another embodiment, requesting the remote WLAN device to retransmit the HARQ coding unit includes indicating one or more attributes of the HARQ coding unit to the remote WLAN device.

In yet another embodiment, the method further includes sending from the WLAN device to the remote WLAN device a trigger frame, which triggers transmission of a HARQ PPDU, or retransmission of the HARQ coding unit. In still another embodiments, requesting the remote WLAN device to retransmit the HARQ coding unit includes verifying that the decoding of the HARQ coding unit did not fail due to collision with a transmission of another remote WLAN device. In some embodiments the method further includes signaling to one or more of the remote WLAN devices one or more of: suspension or resumption of HARQ operation; discarding of one or more HARQ coding units from the HARQ buffer; and current status of the HARQ buffer.

In some embodiments receiving the HARQ PPDUs includes: receiving, in a given HARQ coding unit (i) a Physical layer (PHY) header including a first duration value indicative of a remaining time in a current transmit opportunity (TXOP), and (ii) a Medium Access Control (MAC) header including a second duration value indicative of the remaining time in the current TXOP; and, in accordance with a predefined selection criterion, selecting one of the first and second duration values as a valid duration value.

In some embodiments, selecting the valid duration value includes: when the second duration value is in agreement with the first duration value, selecting the second duration value provided in the MAC header; and when the second duration value is not in agreement with the first duration value, selecting the first duration value provided in the PHY header. In some embodiments, selecting the valid duration value includes: when a designated field in the PHY header indicates that the given HARQ coding unit is not a retransmission, selecting the second duration value provided in the MAC header; and when the designated field in the PHY header indicates that the given HARQ coding unit is a retransmission, selecting the first duration value provided in the PHY header.

In an embodiment, receiving a given HARQ PPDU includes: receiving a first HARQ coding unit having a first Medium Access Control (MAC) header including a first duration value indicative of a remaining time in a current transmit opportunity (TXOP); receiving a second HARQ coding unit having a second MAC header including a second duration value indicative of the remaining time in the current TXOP; and, if the first duration value differs from the second duration value, selecting a smaller of the first and second duration values as a valid duration value.

In another embodiment, receiving a given HARQ PPDU includes extracting from a PHY header of the given HARQ PPDU (i) an indication that a given HARQ coding unit in the given HARQ PPDU is a retransmission, and (ii) an order of the retransmission, and the method includes estimating a remaining time in a current transmit opportunity (TXOP) based on the order of the retransmission.

In some embodiments, transmitting the announcement of the maximal HARQ buffering capability is performed as part of an association process of the WLAN device with the remote WLAN device. Additionally or alternatively, transmitting the announcement of the maximal HARQ buffering capability is performed as part of establishing a HARQ session between the WLAN device and the remote WLAN device.

There is additionally provided, in accordance with an embodiment that is described herein, a Wireless Local-Area Network (WLAN) device including a transceiver and a processor. The transceiver is configured to transmit and receive WLAN signals to and from a remote WLAN device. The processor is configured to receive from the remote WLAN device an announcement of a maximal Hybrid Automatic Repeat Request (HARQ) buffering capability of a receiver of the remote WLAN device, to construct, in response to the announcement, a HARQ Physical-layer Protocol Data Unit (HARQ PPDU) including one or more HARQ coding units, to transmit the HARQ PPDU to the remote WLAN device, and, in response to a request from the remote WLAN device, to retransmit one or more of the HARQ coding units.

There is also provided, in accordance with an embodiment that is described herein, a Wireless Local-Area Network (WLAN) device including a transceiver, a Hybrid Automatic Repeat Request (HARQ) buffer, and a processor. The transceiver is configured to transmit and receive WLAN signals to and from remote WLAN devices. The processor is configured to transmit an announcement of a maximal HARQ buffering capability of the HARQ buffer, to receive, from one or more remote WLAN devices, one or more HARQ Physical-layer Protocol Data Units (HARQ PPDUs) that have been constructed responsively to the announcement, each HARQ PPDU including one or more HARQ coding units, to compute soft-decoding metrics for the received HARQ coding units, to buffer the soft-decoding metrics in the HARQ buffer, and, upon failing to decode a HARQ coding unit using the buffered soft-decoding metrics, to request a remote WLAN device that transmitted the HARQ coding unit to retransmit the HARQ coding unit, to re-compute the soft-decoding metrics for the retransmitted HARQ coding unit, and to re-decode the HARQ coding unit based jointly on the buffered soft-decoding metrics and the re-computed soft-decoding metrics.

The present disclosure will be more fully understood from the following detailed description of the embodiments thereof, taken together with the drawings in which:

DETAILED DESCRIPTION OF EMBODIMENTS

Figure 1:
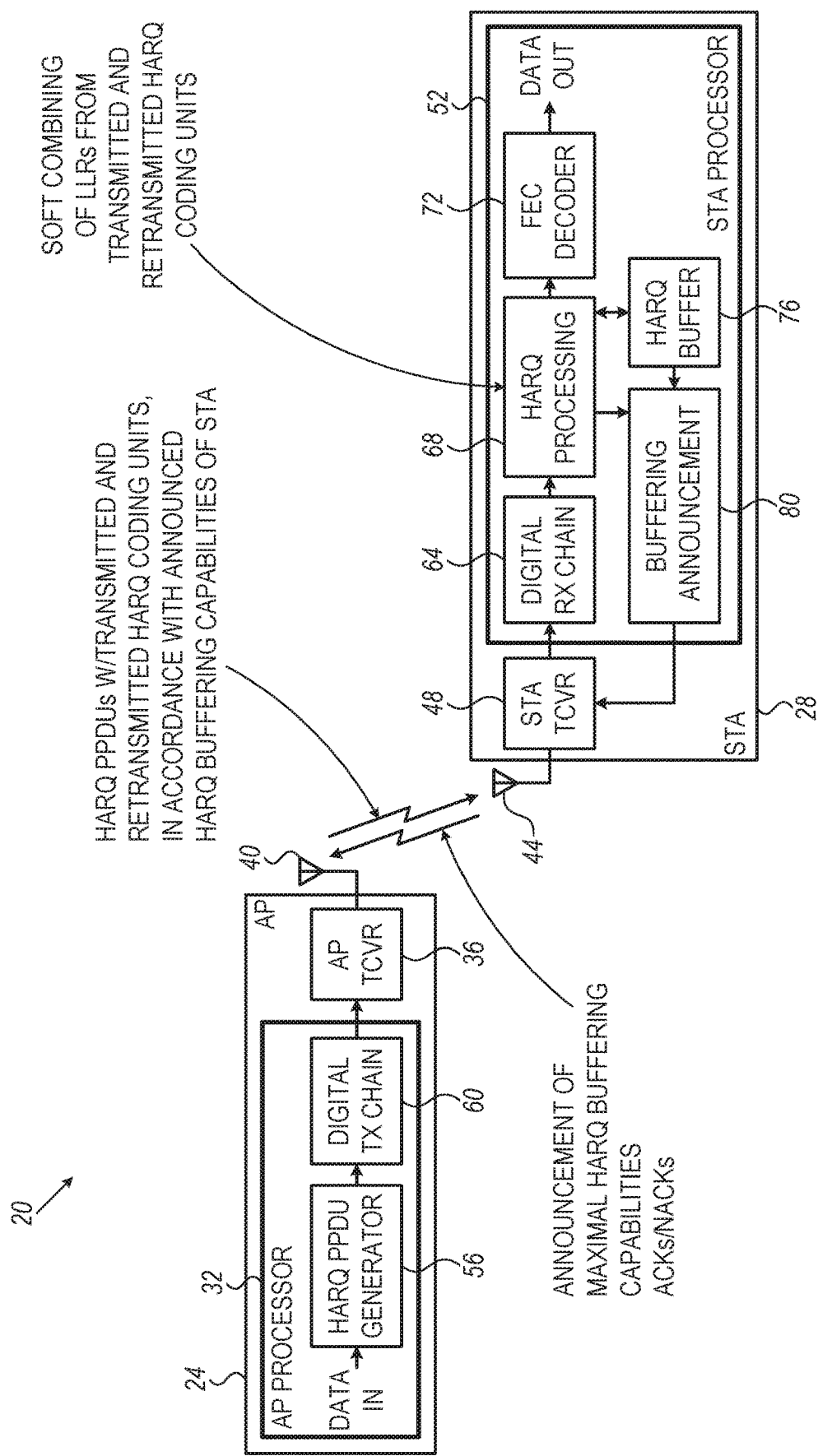
FIG. 1 is a block diagram that schematically illustrates a WLAN communication system, in accordance with an embodiment that is described herein.

Embodiments that are described herein provide Hybrid Automatic Repeat Request (HARQ) techniques for WLAN devices, such as Access Points (APs) and client stations (STAs). The disclosed techniques are applicable to the forward channel (AP to STA), to the reverse channel (STA to AP), as well as to sidelink channels (STA to STA) if used. As such, the description that follows refers to "a transmitter" (which may comprise a transmitter of an AP or of an STA) and to "a receiver" (which may comprise a receiver of an AP or of an STA).

In a typical HARQ scheme, in accordance with an embodiment, the transmitter transmits to the receiver a transmission (e.g., a packet, an Aggregate MAC Protocol Data Unit (A-MPDU) or a frame). The term "packet" in this context refers generally to a data unit in the physical layer (PHY), whereas the term "frame" generally refers to a data unit in the Medium Access Control (MAC) layer. An A-MPDU comprises multiple MPDUs that are acknowledged using a Block Acknowledgement (BA) message, as explained below.

The receiver receives the transmission, computes soft-bits for the bits of the received data, and attempts to decode the FEC code based on the soft-bits. In the present context, the term "soft-bits" refers to non-binary metrics that are indicative not only of the data value (e.g., "0" or "1") but also of the confidence level or reliability of this data value. Soft-bits are also referred to herein as soft-decoding metrics. One example of soft-bits is Log-Likelihood Ratios (LLRs).

If FEC decoding fails, the receiver notifies the transmitter of the failure and the transmitter transmits a retransmission. The retransmission may simply repeat the transmission, and/or it may comprise additional redundancy bits of the FEC that were not transmitted in the transmission. The receiver receives the retransmission, and computes soft-bits for the received bits of the retransmission.

For bits that are present both in the transmission and in the retransmission, the receiver combines the soft-bits of the retransmission with the corresponding soft-bits of the transmission. When the retransmission is a repeated copy of the transmission, the receiver combines each soft-bit of the retransmission with the soft-bits of the corresponding bit of the transmission (this scheme is sometimes referred to as Chase Combining—CC). When the retransmission also comprises additional redundancy bits, the receiver combines soft-bits of corresponding bits that appear both in the transmission and in the retransmission, whereas bits that appear only in the retransmission do not undergo combining (this scheme is sometimes referred to as Incremental Redundancy—IR).

The receiver then reattempts to decode the FEC based on the combined soft-bits. This process may be repeated, if needed, by requesting and receiving one or more additional retransmissions. By combining soft-bits in this manner, HARQ schemes achieve superior error performance, and thus enable enhanced throughput and capacity.

The present disclosure will mainly use terminology consistent with the IEEE 802.11 standards. Some IEEE 802.11 systems employ frame aggregation, in which the transmitter aggregates multiple MAC Protocol Data Units (MPDUs) into an Aggregate MPDU (A-MPDU) and transmits the A-MPDU to the receiver. The receiver responds with a Block Acknowledgement (BA), which notifies the transmitter which of the MPDUs in the A-MPDU were received correctly and which MPDUs have failed. The transmitter retransmits failed MPDUs in some subsequent A-MPDU. In IEEE 802.11 terminology, the physical layer (PHY) comprises a Physical Layer Convergence Procedure (PLCP) sublayer. The terms "A-MPDU" and "PLCP Service Data Unit (PSDU)" refer to the same data unit, from the perspective of the MAC layer and the PHY layer, respectively. The data unit made-up of a PSDU and an additional PHY header is referred to as a PLCP Protocol Data Unit (PPDU).

In disclosed embodiments, when using HARQ, the transmitter generates and sends to the receiver PPDUs that are referred to herein as HARQ PPDUs. Each HARQ PPDU comprises one or more HARQ coding units. In the present context, the term "HARQ coding unit" refers to the basic data unit that is being acknowledged (positively or negatively) and, if needed, retransmitted using HARQ. In various embodiments, HARQ coding units of various sizes and formats may be used, as will be demonstrated below. Within a certain HARQ PPDU, each HARQ coding unit may comprise an original transmission ("original HARQ coding unit") or a retransmission of a previously-transmitted HARQ coding unit ("retransmitted HARQ coding unit").

In some embodiments, the receiver sends to the transmitter an announcement that is indicative of the receiver's maximal HARQ buffering capabilities. In the present context, the term "maximal HARQ buffering capabilities" refers to the maximal memory space that the receiver can provide in a HARQ buffer, for buffering soft-decoding metrics for future combining with soft-decoding metrics of retransmissions. The announcement may indicate, for example, a maximal number of HARQ coding units and a maximal size for an individual HARQ coding unit.

In some embodiments the transmitter constructs the HARQ PPDUs, which will be transmitted to the receiver, in response to the announcement. In some embodiments, the transmitter ensures that the HARQ PPDUs do not exceed the announced maximal HARQ buffering capabilities of the receiver, even under worst-case conditions. In other embodiments, the transmitter allows some small probability that the receiver's HARQ buffering capabilities will be exceeded, in which case the receiver employs some criterion for discarding HARQ coding units from the HARQ buffer.

Various implementation examples and variations of the above-described HARQ scheme are described below.

FIG. 1 is a block diagram that schematically illustrates a WLAN communication system 20, in accordance with an embodiment that is described herein. System 20 comprises an AP 24 and an STA 28. In an embodiment, although not necessarily, AP 24 and STA 28 operate in accordance with one of the IEEE 802.11 standards, e.g., 802.11ac or 802.11ax, or the emerging 802.11be. The figure shows a single AP 24 and a single STA 28, for clarity. Real-life systems, however, typically comprise multiple STAs 28 and may comprise multiple APs 24.

In the present example, AP 24 comprises an AP processor 32, an AP transceiver (transmitter-receiver, or TCVR) 36, and one or more AP antennas 40. AP processor 32 is configured to carry out the various processing tasks of the AP, including various Medium Access Control (MAC) and physical-layer (PHY) processing tasks.

Among other tasks, AP processor 32 is configured to generate HARQ Physical-layer Protocol Data Units (HARQ PPDUs) that convey data destined to STA 28. The HARQ PPDUs comprise original HARQ coding units, and/or retransmitted HARQ coding units in response to acknowledgements (ACKs) and/or negative acknowledgements (NACKs) received from STA 28. AP TCVR 36 is configured to transmit WLAN signals that carry the HARQ PPDUs to STA 28 via antennas 40, and to receive WLAN signals that carry, for example, the ACKs and/or NACKS from STA 28. As will be described below, in some embodiments AP TCVR 36 is configured to receive from STA 28 an announcement of the maximal HARQ buffering capabilities of the STA, and AP processor 32 is configured to generate the HARQ PPDUs considering the STA's maximal HARQ buffering capabilities.

In an embodiment, STA 28 comprises one or more STA antennas 44, an STA TCVR 48, and an STA processor 52. STA TCVR 48 is configured to receive, via antennas 44, WLAN signals that carry HARQ PPDUs from AP 24, and to transmit the announcement of maximal HARQ buffering capabilities to AP 24. STA processor 52 is configured to carry out the various processing tasks of the STA, e.g., various PHY and MAC processing tasks.

Among other functions, STA processor 52 is configured to apply soft-bit computation, soft-bit combining and FEC decoding to the data of received original retransmitted HARQ coding units. STA processor 52 is also configured to generate ACKS and/or NACKs for requesting retransmissions of HARQ coding units from AP 24.

The description above focuses on HARQ in forward-channel communication, i.e., transfer of data from AP 24 to STA 28, for the sake of clarity. Typically, however, AP 24 and STA 28 and their various components are also configured to communicate over the reverse channel, i.e., to transfer data from STA 28 to AP 24. The disclosed HARQ techniques are applicable to reverse-channel communication, as well. The focus on the forward channel is made by way of example only, for the sake of clarity. APs and STAs are collectively referred to herein as WLAN devices.

In the example embodiment of FIG. 1, AP processor 32 comprises a HARQ PPDU generator 56 and a digital TX chain 60. HARQ PPDU generator 56 receives data to be transmitted to STA 28 and generates HARQ PPDUs conveying the data. As part of the HARQ PPDU generation, generator 56 typically also performs tasks such as scrambling and FEC encoding. Digital TX chain 60 applies various transmission-related signal-processing operations of AP processor 32, e.g., stream parsing, interleaving, constellation mapping, space-time coding, spatial multiplexing, IDFT, guard interval insertion and windowing. The output of digital TX chain 60 typically comprises a sequence of Orthogonal Frequency Division Multiplex (OFDM) symbols, which is provided to AP TCVR 36 for transmission.

In the example embodiment of FIG. 1, STA processor 52 comprises a digital RX chain 64, a HARQ processing block 68, a FEC decoder 72, a HARQ buffer 76 and a buffering announcement block 80. Digital RX chain 64 receives from STA TCVR 48 a digital baseband signal, typically comprising a sequence of OFDM symbols. Digital RX chain 64 typically performs various reception-related signal-processing operations of STA processor 52, e.g., demodulation, de-interleaving, stream de-parsing and soft-decoding metrics computation. HARQ processing block 68 carries out HARQ-related tasks such as buffering of soft-decoding metrics, and soft-combining of newly-computed soft-decoding metrics and buffered soft-decoding metrics. FEC decoder 72 performs soft FEC decoding based on the soft-decoding metrics, so as to produce output data.

In an embodiment, STA processor 76 further comprises a HARQ buffer 76 for buffering soft-decoding metrics, for soft combining with soft-decoding metrics of subsequent retransmissions. Buffering announcement block 80 is configured to generate an announcement that reports the maximal buffering capabilities of HARQ buffer 76. The announcement is provided to STA TCVR 48 for transmission to AP 24.

The configurations of system 20, AP 24 and STA 28 of FIG. 1, and their components, such as the elements of AP processor 32 and STA processor 52, are depicted solely by way of example. In alternative embodiments, any other suitable configurations can be used. The various elements of AP 24 and STA 28 may be implemented using dedicated hardware or firmware, such as hard-wired or programmable components, e.g., in one or more Application-Specific Integrated Circuits (ASICs), Field-Programmable Gate Arrays (FPGAs) or RF Integrated Circuits (RFICs), using software, or using a combination of hardware and software elements.

In some embodiments, certain elements of AP 24 and/or STAs 28, e.g., certain functions of AP processor 32 and/or STA processor 52, are implemented in one or more programmable processors, which are programmed in software to carry out the functions described herein. The software may be downloaded to the one or more processors in electronic form, over a network, for example, or it may, alternatively or additionally, be provided and/or stored on non-transitory tangible media, such as magnetic, optical, or electronic memory.

Figure 2:
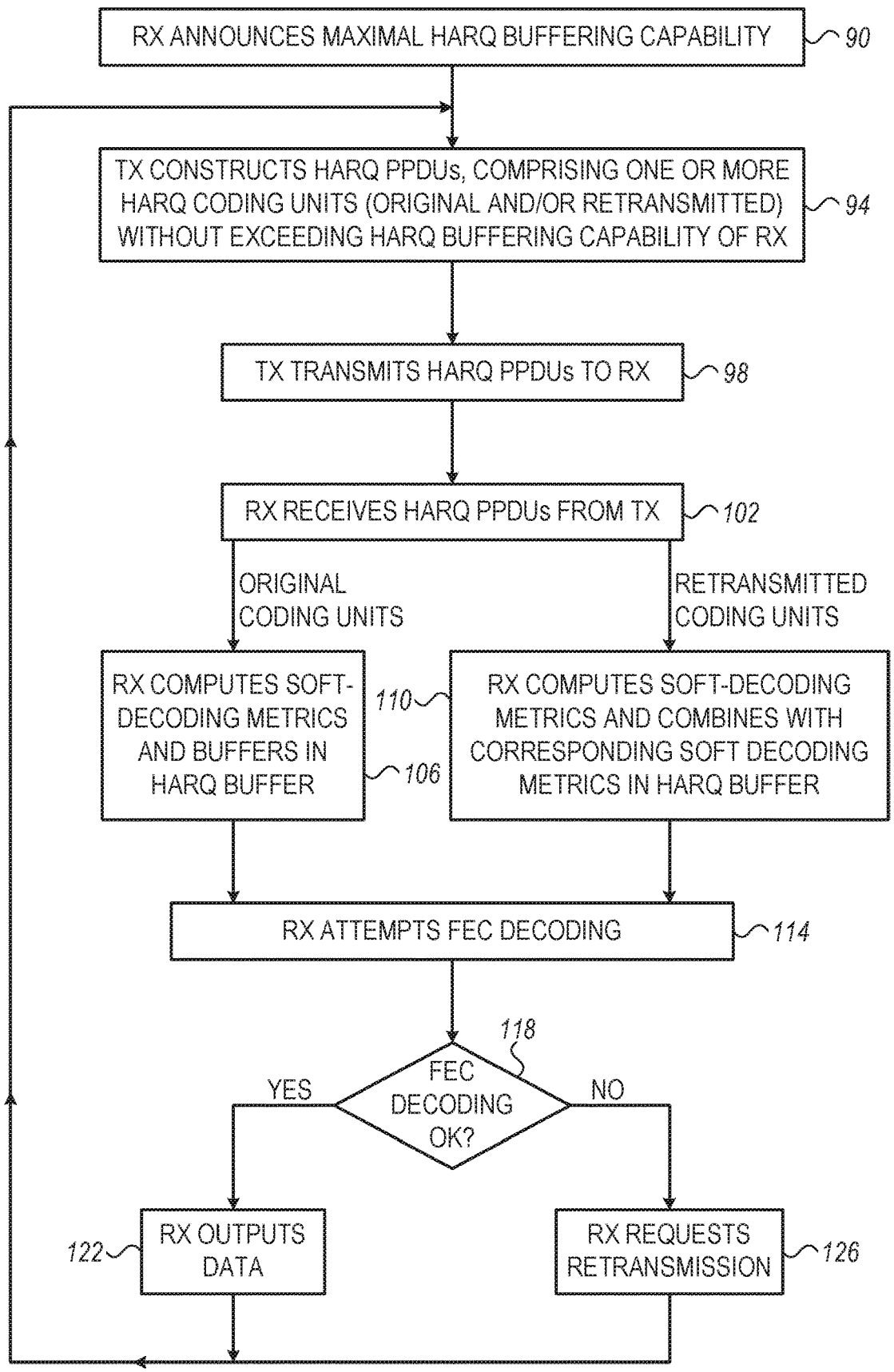
FIG. 2 is a flow chart that schematically illustrates a method for HARQ in the WLAN communication system of FIG. 1, in accordance with an embodiment that is described herein.

FIG. 2 is a flow chart that schematically illustrates a method for HARQ in the WLAN communication system of FIG. 1, in accordance with an embodiment that is described herein. In the present example, AP 24 plays the role of the transmitter, and STA 28 plays the role of the receiver. As noted above, this choice is made solely for clarity—The disclosed technique is applicable to the reverse link as well.

The method begins with buffering announcement block 80 of STA 28 announcing the maximal HARQ buffering capabilities of HARQ buffer 76, at an announcement operation 90. AP processor 32 receives and records the announced maximal HARQ buffering capabilities.

At a PPDU construction operation 94, HARQ PPDU generator 56 in AP processor 32 constructs one or more HARQ PPDUs that carry data for transmission to STA 28. Each HARQ PPDU comprises one or more HARQ coding units (original and/or retransmitted). In an embodiment, HARQ PPDU generator 56 sets the parameters of the HARQ PPDUs (e.g., the number and sizes of the HARQ coding units) so as not to exceed the maximal HARQ buffering capabilities of STA 28.

At a transmission operation 98, digital TX chain 60 and AP TCVR 36 transmit the HARQ PPDUs to STA 28. In STA 28, STA TCVR 48 and digital RX chain 64 receive the HARQ PPDUs and deliver them to HARQ processing block 68. HARQ processing block 68 processes each HARQ coding unit separately, in a manner that differs between original HARQ coding units and retransmitted HARQ coding units.

For each original HARQ coding unit in the received HARQ PPDUs, HARQ processing block 68 computes soft-decoding metrics (e.g., LLRs) for the bits of the HARQ coding unit, and stores the soft-decoding metrics in HARQ buffer 76, at a buffering operation 106.

For each retransmitted HARQ coding unit in the received HARQ PPDUs, HARQ processing block 68 computes soft-decoding metrics (e.g., LLRs) for the bits of the HARQ coding unit, and combines the newly-computed soft-decoding metrics with the corresponding soft-decoding metrics that have been previously buffered in HARQ buffer 76, at a combining operation 110.

For each HARQ coding unit in the received HARQ PPDUs, FEC decoder 72 in STA 28 attempts to decode the FEC, at a decoding operation 114. For an original HARQ coding unit, FEC decoder 72 attempts to decode the FEC based on the soft-decoding metrics that were computed at operation 106 above. For a retransmitted HARQ coding unit, FEC decoder 72 attempts to decode the FEC based on the combined soft-decoding metrics that were produced at operation 110 above.

At a checking operation 118, STA processor 52 checks, per HARQ coding unit, whether FEC decoder 72 has succeeded or failed in decoding the FEC. If decoding was successful, STA processor 52 outputs the decoded data of the HARQ coding unit, at an output operation 122. If decoding has failed, STA processor 52 requests a retransmission of the HARQ coding unit from AP 24, at a retransmission requesting operation 126. In an example embodiment, STA processor 52 sends to AP 24 a Block Acknowledgement (BA) per HARQ PPDU. The BA indicates which of the HARQ coding units in the HARQ PPDU were decoded successfully (if any), and which (if any) have failed. The method loops back to PPDU construction operation 94 above.

The method flow of FIG. 2 is an example flow, which is depicted solely for the sake of conceptual clarity. In alternative embodiments, any other suitable flow can be used. For example, the negotiation between AP 24 and STA 28 as to the HARQ buffering capabilities of the STA can be carried out at various times and using various messages or Information Elements (IEs).

In an example embodiment, buffering announcement block 80 announces the maximal HARQ buffering capabilities of the STA, and AP processor 32 returns an acknowledgement, as part of the association process of STA 28 with AP 24. In this embodiment, the announcement and acknowledgement may be sent in messages such as Beacon, Probe Request/Response or Association Request/Response.

In some embodiment, no additional negotiation is performed regarding maximal HARQ buffering capabilities, and all subsequent HARQ PPDUs are constructed based on the initial negotiation conducted during association.

Additionally or alternatively, buffering announcement block 80 announces the maximal HARQ buffering capabilities of the STA, and AP processor 32 returns an acknowledgement, at any desired time during operation of system 20, e.g., immediately prior to a HARQ session. In such embodiments, "HARQ Request/Response" messages or Information Elements (IEs) are defined, and the AP and STA announce and acknowledge the maximal HARQ buffering capabilities using these messages or IEs.

In yet another embodiment, the Association Request/Response messages are used for negotiating the maximal HARQ buffering capabilities, e.g., by defining a HARQ Request IE in the Association Request frame, and defining a HARQ Response IE in the Association Response frame.

In some IEEE 802.11 systems, WLAN packets are associated with various Traffic Identifiers (TIDs) that indicate the type of traffic they carry, e.g., video, voice or data. The TIDs are typically associated with respective Quality-of-Service (QoS) Access Categories (ACs) having different priorities. In some embodiments, a given HARQ session between AP 24 and STA 28 is shared by all TIDs, i.e., not TID-specific. In other embodiments, a given HARQ session is dedicated to a single TID. In these embodiments, the HARQ PPDUs comprise HARQ coding units having only MPDUs sharing a common TID.

In some embodiments, once the initiating device (e.g., AP 24) and the responding device (e.g., STA 28) negotiate a HARQ buffer size corresponding to a certain number of received HARQ coding units, the responding device reserves the negotiated HARQ buffer size for the initiating device unconditionally. In other embodiments, the responding device initially reserves the negotiated HARQ buffer size for the initiating device (denoted "device 1). If, however, the responding device receives HARQ coding units from another WLAN device (denoted "device 2"), the responding device may discard one or more of the HARQ coding units of device 1 in order to store the newly-received HARQ coding units of device 2.

In some embodiments, once the initiating device (AP 24 in the present example) and the responding device (STA 28 in the present example) negotiate a HARQ buffer size corresponding to a certain number of received HARQ coding units, the initiating device is prevented from including more than the negotiated number of HARQ coding units in the HARQ PPDU. In this manner, HARQ buffer 76 is guaranteed not to overflow. In other embodiments, the initiating device is allowed to transmit in the HARQ PPDU more than the negotiated number of HARQ coding units (on the assumption that the number of failed HARQ coding units is likely to be below the negotiated number of HARQ coding units). In the unlikely event that the number of failed HARQ coding units exceeds the negotiated number of HARQ coding units in buffer 76, HARQ processing block 68 in STA 28 buffers only some of the failed HARQ coding units, up to the available buffer space, and discards the others.

In some embodiments, HARQ PPDU generator 56 constructs the HARQ PPDUs such that each HARQ PPDU comprises only a single HARQ coding unit. In other words, the entire PSDU in the HARQ PPDU forms a single HARQ coding unit. In this embodiment, the announcement of STA 28 (operation 90 above) indicates the upper bound of the PSDU length, in octets. This announced length should allow AP processor 32 to add up to seven additional padding bits to the HARQ PPDU in the PHY layer. The announced length can be less than the maximal size of the maximal MPDU or A-MPDU supported by STA 28.

In this embodiment, i.e., when a HARQ PPDU comprises only a single HARQ coding unit, the single PSDU in the HARQ coding unit may comprise, for example, one fragment in an MPDU, one MAC Service Data Unit (MSDU) of an MPDU, one Aggregated MSDU (A-MSDU) in an MPDU, one Management MPDU (MMPDU) in an MPDU, or an A-MPDU.

In other embodiments, HARQ PPDU generator 56 segments a HARQ PPDU into multiple HARQ coding units. The HARQ coding units in a HARQ PPDU may be of the same length or of different lengths. In some embodiments segmentation of the HARQ PPDU into HARQ coding unit is performed in the MAC layer. In alternative embodiments the segmentation is performed in the PHY layer.

Consider embodiments in which segmentation into HARQ coding units is performed in the MAC layer. In an example embodiment, STA 28 announces the maximal number of HARQ coding units, and the maximal size of an individual HARQ coding unit, supported by HARQ buffer 76. The announced size can be less than the maximal MPDU or A-MPDU size. Each HARQ coding unit may comprise one or more complete A-MPDU subframes. In an alternative embodiment, a HARQ coding unit may comprise one or more incomplete A-MPDU subframes.

An A-MPDU subframe may comprise, for example, one fragment in an MPDU, one MSDU of an MPDU, one MMPDU in an MPDU, one A-MSDU in an MPDU, or only an MPDU delimiter without any MPDU. In an embodiment, HARQ PPDU generator 56 sets all the HARQ coding units in a certain HARQ PPDU to be of the same length, e.g., a length decided depending on the Modulation and Coding Scheme (MCS) and/or bandwidth being used. In another embodiment, the HARQ coding units in a HARQ PPDU may differ in length from one another, e.g., selected from among a set of predefined lengths denoted x, 2x, 4x, 8x, . . . , wherein the basic length x is decided depending on the MCS and/or bandwidth being used.

Figure 3:
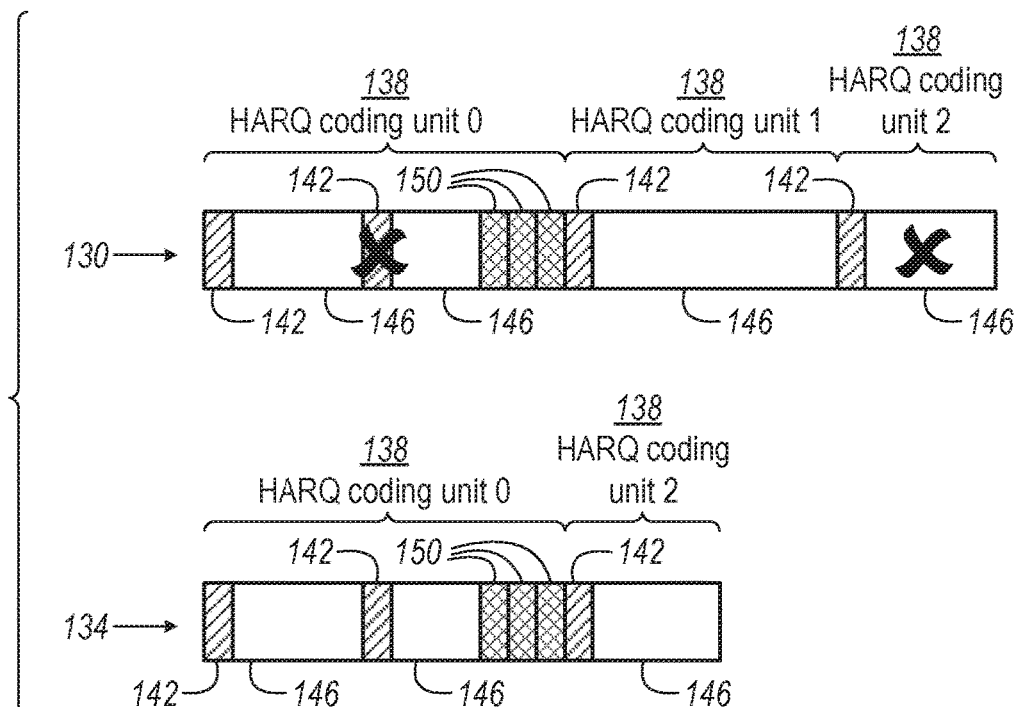
FIG. 3 is a diagram that schematically illustrates a HARQ Physical-layer Protocol Data Unit (HARQ PPDU) comprising original HARQ coding units, and a HARQ PPDU comprising retransmitted HARQ coding units, in accordance with an embodiment that is described herein.

FIG. 3 is a diagram that schematically illustrates a HARQ PPDU 130 comprising original HARQ coding units, and a HARQ PPDU 134 comprising retransmitted HARQ coding units, in accordance with an embodiment that is described herein. In this example, segmentation of the HARQ PPDUs into HARQ coding units 138 is performed in the MAC layer. HARQ PPDU generator 56 populates each HARQ coding unit 138 with one or more MPDUs 146 that carry data. Each MPDU 146 is preceded by a respective MPDU delimiter 142.

In some embodiments, a predefined minimal spacing is required between the start times of successive MPDUs. This requirement is imposed in order to allow the receiver (STA processor 52 in this example) sufficient time to process each MPDU. If a certain MPDU is too short to satisfy the minimal spacing, HARQ PPDU generator 56 appends the short MPDU with one or more additional MPDU delimiters 150 (referred to herein as "minimal-spacing delimiters"). In an embodiment, when segmenting the HARQ PPDU into HARQ coding units, HARQ PPDU generator 56 adds each minimal-spacing delimiter 150 to the HARQ coding unit 138 containing the MPDU 146 that required the minimal-spacing delimiter 150. This condition guarantees that any retransmitted HARQ coding units will also meet the minimal spacing requirement between MPDU start times.

In the example of FIG. 3, HARQ PPDU 130 comprises three original HARQ coding units numbered 0, 1 and 2. HARQ coding unit 0 comprises two MPDUs 146. The second MPDU in HARQ coding unit 0 is short and is therefore appended by HARQ PPDU generator 56 with three minimal-spacing delimiters 150.

In the present example, from among the HARQ coding units of HARQ PPDU 130, only HARQ coding unit 1 is received successfully, and HARQ coding units 0 and 2 fail. Therefore, HARQ PPDU 134 comprises two retransmitted HARQ coding units, which retransmit HARQ coding units 0 and 2. As seen, the retransmission of HARQ coding unit 0 again comprises minimal-spacing delimiters 150, as in the original HARQ coding unit. As a result, in HARQ PPDU 134, sufficient spacing is maintained between the start times of (i) the last MPDU in HARQ coding unit 0 and (ii) the first MPDU in HARQ coding unit 2.

Consider now alternative embodiments, in which segmentation into HARQ coding units is performed in the PHY layer. In an example embodiment, STA 28 announces the maximal number of HARQ coding units, and the maximal size of an individual HARQ coding unit, supported by HARQ buffer 76. The announced size can be less than the maximal MPDU or A-MPDU size. In an embodiment, HARQ PPDU generator 56 sets all the HARQ coding units in a certain HARQ PPDU to be of the same length. In another embodiment, the HARQ coding units in a HARQ PPDU may differ in length from one another, e.g., selected from among a set of predefined lengths.

Figure 4:
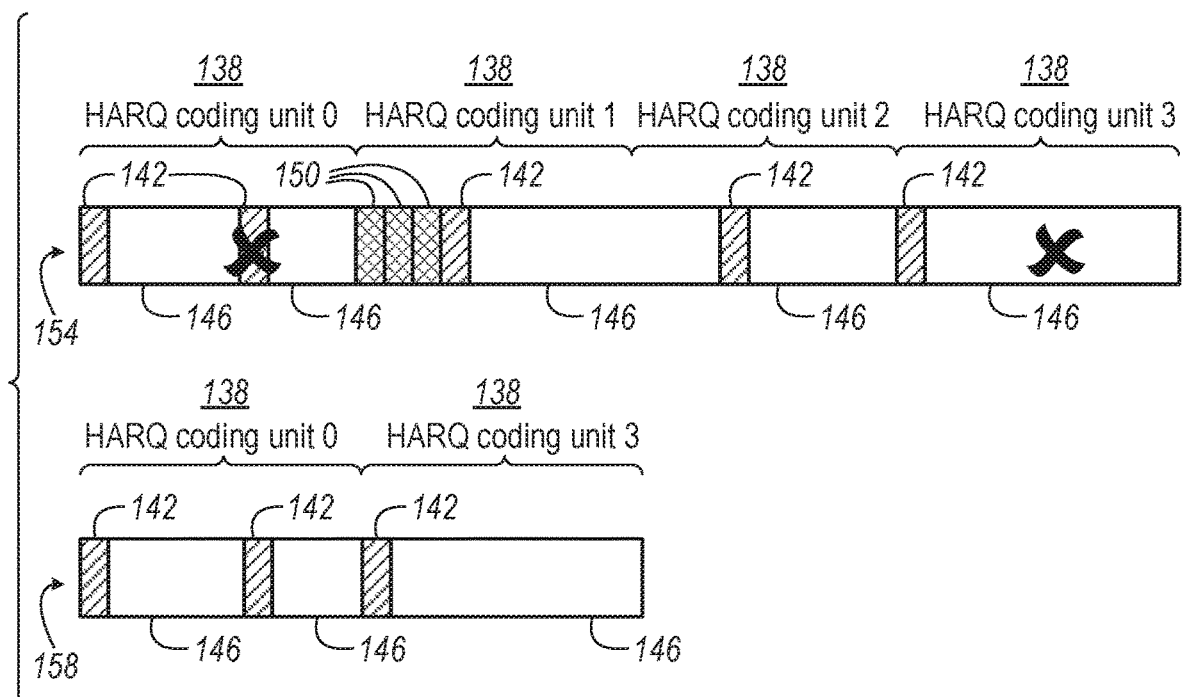
FIG. 4 is a diagram that schematically illustrates a HARQ Physical-layer Protocol Data Unit (HARQ PPDU) comprising original HARQ coding units, and a HARQ PPDU comprising retransmitted HARQ coding units, in accordance with an alternative embodiment that is described herein.

FIG. 4 is a diagram that schematically illustrates a HARQ PPDU 154 comprising original HARQ coding units, and a HARQ PPDU 158 comprising retransmitted HARQ coding units, in accordance with an alternative embodiment that is described herein. Unlike the example of FIG. 3 above, in the present example HARQ PPDU generator 56 segments each HARQ PPDU into HARQ coding units 138 in the PHY layer.

Since segmentation into HARQ coding units is performed in the PHY layer, HARQ PPDU generator 56 has no way of ensuring that each minimal-spacing delimiter 150 will be included in the same HARQ coding unit 138 as the MPDU 146 that required this delimiter 150. Therefore, in some cases the minimal spacing requirement between MPDU start times may be violated during retransmission.

An example of such a violation occurs in HARQ PPDU 158. In this example, HARQ PPDU 158 comprises retransmissions of HARQ coding units 0 and 3 (whose original transmissions were not adjacent in HARQ PPDU 154, but whose retransmissions are adjacent in HARQ PPDU 158).

In some scenarios, violation of the minimal spacing between MPDU start times can prevent STA processor 52 from successfully processing one or more of the MPDUs 146. In various embodiments, AP processor 32 prevents such failures in various ways. In one embodiment, AP processor 32 requests STA processor 52 to discard the soft-decoding metrics of the related HARQ coding units from HARQ buffer 72. In this embodiment, the retransmitted HARQ coding units will be regarded by STA processor 52 as original HARQ coding units, thereby incurring less processing power.

In another embodiment, HARQ PPDU generator 56 inserts one or more other HARQ coding units between the HARQ coding units that violate the minimal-spacing condition. In this embodiment, HARQ coding units are received out-of-order, and therefore some identifier is needed to re-order them. The identifiers may be signaled, for example, in HARQ signaling in the PHY header. Further alternatively, any other suitable technique can be used for prevents failures caused by insufficient spacing between start times of successive MPDUs.

In some embodiments, HARQ PPDU generator 56 in AP processor 32 marks each HARQ coding unit in the HARQ PPDU with a respective identifier (referred to herein as "HARQ ID"). If a certain HARQ coding unit is retransmitted, HARQ PPDU generator 56 marks the retransmitted HARQ coding unit with the same HARQ identifier as the original HARQ coding unit. HARQ processing block 68 in STA processor 52 uses the HARQ IDs to correlate the original and retransmitted HARQ coding units in order to combine their soft-decoding metrics.

In some embodiments, the HARQ ID comprises an explicit numerical value (e.g., an incrementing sequence number) that is embedded in the HARQ coding unit. In other embodiments, HARQ PPDU generator 56 (in the AP) and HARQ processing block 68 (in the STA) use one or more attributes of the HARQ coding unit as a HARQ ID. For example, attributes such as PPDU or HARQ coding unit length, MCS, number of spatial streams (Nss) and/or bandwidth can be used as the HARQ ID of a HARQ coding unit. In these embodiments, HARQ processing block 68 (in the STA) requests retransmission of a HARQ coding unit by sending the attribute(s) of the HARQ coding unit in question. HARQ PPDU generator 56 (in the AP) identifies a previously-transmitted HARQ coding unit that matches the requested attribute(s), and retransmits the identified HARQ coding unit. To avoid ambiguity, the AP is prevented from transmitting another original HARQ coding unit having the same attribute(s), until the first HARQ coding unit has been decoded successfully by the STA and acknowledged.

In yet other embodiments, HARQ PPDU generator 56 (in the AP) and HARQ processing block 68 (in the STA) use the sequential position of each HARQ coding unit in the HARQ PPDU as a HARQ ID. In other words, the $n^{th}$ HARQ coding unit in the HARQ PPDU is regarded as having HARQ ID=n. If multiple HARQ coding units fail to decode successfully and have to be retransmitted, HARQ PPDU generator 56 (in the AP) positions the retransmitted HARQ coding units in sequential order at the beginning of a subsequent HARQ PPDU. This order enables HARQ processing block 68 (in the STA) to correlate the retransmitted and original HARQ coding units correctly. If the subsequent HARQ PPDU (that comprises the retransmitted HARQ coding units) also comprises one or more new original HARQ coding units, HARQ PPDU generator 56 positions the original HARQ coding units after the retransmitted HARQ coding units.

In some IEEE 802.11 systems, once a STA has gained access to the channel for transmitting, the AP assigns the STA a certain time interval that is referred to as a Transmission Opportunity (TXOP). During the TXOP other STAs are prevented from transmitting, and the winning STA is required to conclude its communication with the AP by the end of the TXOP. In various embodiments, system 20 may coordinate HARQ transmissions with TXOPs in various ways.

Figure 5:
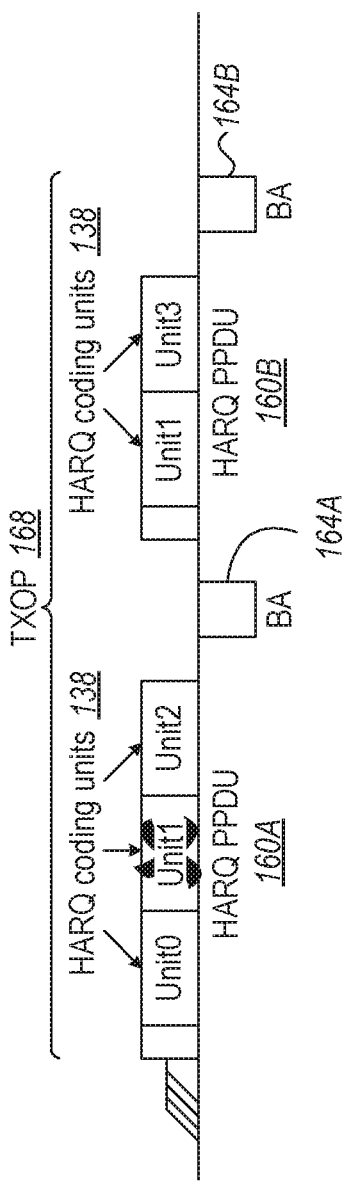
FIG. 5 is a diagram that schematically illustrates multiple HARQ PPDUs and Block Acknowledgements (BAs) transmitted in the same transmission opportunity (TXOP), in accordance with an embodiment that is described herein.

FIG. 5 is a diagram that schematically illustrates multiple HARQ PPDUs and Block Acknowledgements (BAs) transmitted in the same transmission opportunity (TXOP), in accordance with an embodiment that is described herein. In this embodiment, HARQ PPDU generator 56 (in the AP) is constrained to retransmit a HARQ coding unit in the same TXOP as the respective original HARQ coding unit. If one or more HARQ coding units have to be retransmitted, HARQ PPDU generator 56 positions the retransmitted HARQ coding units first in the HARQ PPDU, in sequential order, and before any new original HARQ coding units. This scheme obviates the need to mark HARQ coding units with HARQ IDs.

In the example of FIG. 5, AP 24 transmits to STA 28 a first HARQ PPDU 160A comprising three original HARQ coding units 138 denoted Unit0, Unit1 and Unit2. STA 28 responds with a BA 164A, which indicates that Unit0 and Unit2 were decoded successfully, and that Unit1 has failed. In response, AP 24 transmits a second HARQ PPDU 160B. This second HARQ PPDU begins with a retransmission of Unit1, followed by a new HARQ coding unit denoted Unit3. STA 28 responds to HARQ PPDU 160B with a BA 164B. As seen, both HARQ PPDUs (and specifically, the original transmission and the retransmission of Unit 1) are transmitted during a single TXOP 168.

Figure 6:
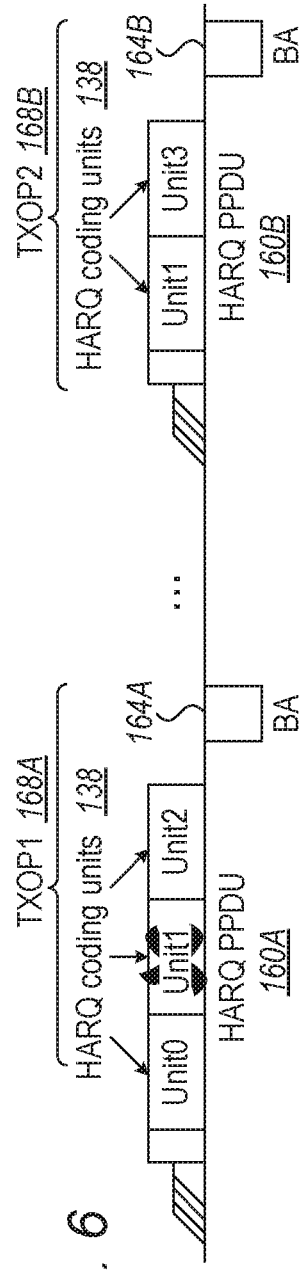
FIG. 6 is a diagram that schematically illustrates multiple HARQ PPDUs and BAs transmitted in different TXOPs, in accordance with an embodiment that is described herein.

FIG. 6 is a diagram that schematically illustrates multiple HARQ PPDUs and BAs transmitted in different TXOPs, in accordance with an embodiment that is described herein. In this alternative embodiment, HARQ PPDU generator 56 (in the AP) is permitted to retransmit an original HARQ coding unit and a retransmission of that HARQ coding unit in different TXOPs. If one or more HARQ coding units have to be retransmitted, HARQ PPDU generator 56 positions the retransmitted HARQ coding units first in the HARQ PPDU, in sequential order, and before any new original HARQ coding units.

In the example of FIG. 6, AP 24 transmits to STA 28 a first HARQ PPDU 160A in a first TXOP 168A. HARQ PPDU 160A comprises three original HARQ coding units 138 denoted Unit0, Unit1 and Unit2. STA 28 responds with a BA 164A, which indicates that Unit0 and Unit2 were decoded successfully, and that Unit1 has failed.

In response, AP 24 transmits a second HARQ PPDU 160B in a second TXOP 168B. HARQ PPDU 160B begins with a retransmission of Unit1, followed by a new HARQ coding unit denoted Unit3. STA 28 responds to HARQ PPDU 160B with a BA 164B. In this example, unlike the example of FIG. 5, the two HARQ PPDUs (and specifically, the original transmission and the retransmission of Unit 1) are transmitted in two different TXOPs.

Figure 7:
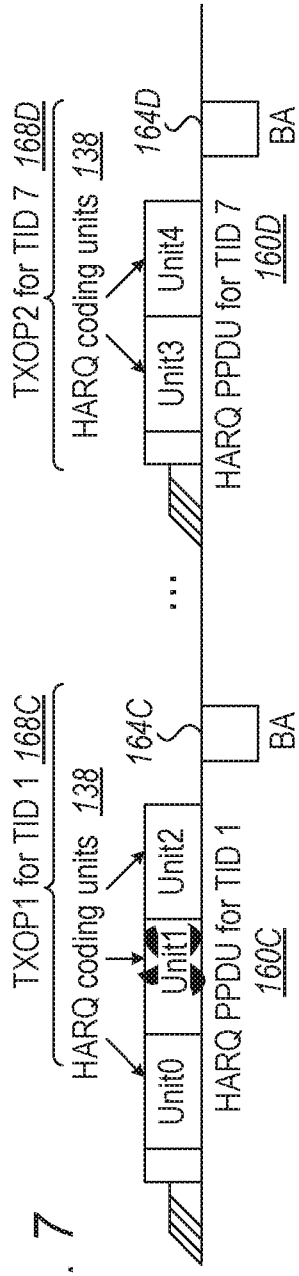
FIG. 7 is a diagram that schematically illustrates multiple HARQ PPDUs and BAs transmitted in different TXOPs, in accordance with an alternative embodiment that is described herein.

FIG. 7 is a diagram that schematically illustrates multiple HARQ PPDUs and BAs transmitted in different TXOPs, in accordance with another alternative embodiment that is described herein. In this embodiment, too, HARQ PPDU generator 56 (in the AP) is permitted to retransmit an original HARQ coding unit and a retransmission of that HARQ coding unit in different TXOPs. Moreover, if one or more HARQ coding unit have to be retransmitted, HARQ PPDU generator 56 is permitted to transmit new original HARQ coding units before the retransmitted HARQ coding units.

In the example of FIG. 7, AP 24 transmits to STA 28 a first HARQ PPDU 160C in a first TXOP 168C. HARQ PPDU 160C is transmitted in a first TXOP 168C. TXOP 168C is dedicated to a certain traffic type associated with TID=1, and HARQ PPDU 160C comprises HARQ coding units associated with TID=1. HARQ PPDU 160C comprises three original HARQ coding units 138 denoted Unit0, Unit1 and Unit2. STA 28 responds with a BA 164C, which indicates that Unit0 and Unit2 were decoded successfully, and that Unit1 has failed.

Subsequently, AP 24 transmits a second HARQ PPDU 160D in a second TXOP 168D. TXOP 168D is dedicated to a traffic type associated with TID=7, and HARQ PPDU 160D comprises HARQ coding units associated with TID=7. HARQ PPDU 160D comprises two new original HARQ coding units denoted Unit3 and Unit4. STA 28 responds to HARQ PPDU 160D with a BA 164D. In this example, the retransmission of Unit1 is deferred to some later TXOP (not shown in the figure), in order to give precedence to the TXOP of TID=7.

Some IEEE 802.11 systems apply Quality-of-Service (QoS) using a mechanism referred to as Enhanced Distributed Channel Access (EDCA). In EDCA, traffic is classified into four Access Categories (ACs) having increasing priorities—"Background", "Best-effort", "Video" and "Voice". (The "voice" AC has the highest priority, and the "Background" AC has the lowest priority.) Each WLAN device maintains a respective back-off counter and a respective TX queue for each AC. When a back-off of a certain AC reaches zero, this AC becomes the "primary AC," and the WLAN device transmits any pending frames associated with this AC. In various embodiments, system 20 coordinates HARQ transmissions with EDCA in various ways.

In one embodiment, if the back-off counter of an AC reaches zero, and AP 24 also has a pending retransmitted HARQ coding unit of a different AC, HARQ PPDU generator 56 positions the pending retransmitted HARQ coding unit first in the HARQ PPDU. In this manner, HARQ PPDU generator 56 can give precedence to retransmission of a HARQ coding unit over transmission of original HARQ coding units, even when the original HARQ coding units have higher-priority QoS Access Categories (ACs) than the retransmitted HARQ coding unit.

In another embodiment, if the back-off counter of an AC reaches zero, and AP 24 also has a pending retransmitted HARQ coding unit of a different AC, AP processor 32 transmits the frames of the primary AC first, without using a HARQ PPDU. In yet another embodiment, if the back-off counter of an AC reaches zero, and AP 24 also has a pending retransmitted HARQ coding unit of a different AC, AP processor 32 transmits the frames of the primary AC first in a HARQ PPDU.

In still another embodiment, if the back-off counter of an AC reaches zero, and AP 24 also has a pending retransmitted HARQ coding unit of a different AC having higher priority than the primary AC, HARQ PPDU generator 56 positions the pending retransmitted HARQ coding unit first in the HARQ PPDU.

In the embodiments described so far, HARQ transmission is initiated by the transmitter (the WLAN device in which the data originates). In alternative embodiments, however, HARQ transmission can be initiated by the receiver (the WLAN device to which the data is destined). Consider, for example, a system operating in accordance with the High-Efficiency (HE) or Extremely High Throughput (EHT) variant, and consider implementation of HARQ on the uplink channel (in which STA 28 serves as the transmitter and AP 24 serves as the receiver). In some embodiments, AP 24 (playing the role of the receiver) solicits STA 28 (which plays the role of the transmitter) to transmit HARQ PPDUs, by transmitting trigger frames to the STA. This technique may use the HE/EHT Trigger-Based (TB) PPDU feature defined in IEEE 802.11.

In an example embodiment, AP processor 32 generates a trigger frame that solicits one or more STAs 28 to transmit a HARQ PPDU. In some embodiments, the HARQ parameters are defined by AP processor 32 and sent in the trigger frame (for example in the PHY SIG signaling fields, e.g., EHT SIG-C or SIG-B fields). In other embodiments, the HARQ parameters are defined by the solicited STAs. When multiple STAs are solicited by a trigger frame, each STA transmits its HARQ PPDU in a different 20 MHz channel. Alternatively, each solicited STA may transmit the relevant PHY SIG part in the Resource Unit (RU) allocated to the STA. Typically, transmission parameters for the solicited HARQ PPDU (e.g., MCS, RU size, RU location and/or coding) are defined by AP 24. When AP 24 transmits a trigger frame that solicits a retransmission of a HARQ coding unit, e.g., indicates a previously-used HARQ ID, the trigger frame typically indicates the same transmission parameters (e.g., MCS, RU size, RU location and/or PPDU length) as the original transmission of the HARQ coding unit.

In some embodiments, when a WLAN device (playing the role of the receiver) fails to decode a HARQ PPDU correctly, the receiver verifies whether the failure is due to a collision with another transmission (e.g., from another BSS) or not. If the failure is due to a collision with another transmission, the receiver may discard the failed HARQ coding units. If the failure is not caused by a collision, the receiver typically waits a predefined Short Inter-Frame Space (SIFS) after the HARQ PPDU, and then sends a Negative Acknowledgement (NAK) to the transmitter.

In various embodiments, the receiver uses various criteria for assessing whether a failure to decode a HARQ PPDU is due to collision or not. Several non-limiting example criteria for deciding that a failure is not caused by collision are the following:

- The receiver has decoded the PHY header of the HARQ PPDU correctly.
- The received HARQ PPDU ends at the time indicated by the "legacy SIG" field of the HARQ PPDU. The end of the HARQ PPDU can be decided, for example, by observing that only random noise is detected (e.g., received signal level is below a predefined level) after the indicated HARQ PPDU length.
- No other transmission (e.g., energy above −82 dBm for a WLAN signal, or above −62 dBm for a non-WLAN signal) is detected immediately prior to the received HARQ PPDU.
- During reception of the HARQ PPDU, the received signal level varies by less than a predefined variation.
- The receiver's Network Allocation Vector (NAV) timer is zero, indicating a supposedly clear channel.
- The PHY header of the HARQ PPDU comprises a "BSS color" parameter that identifies the AP, and no BSS color collision is detected.

In various embodiments, the receiver may use any of the above criteria or any other suitable criterion, or a combination of two or more criteria, for deciding whether a failure is caused by collision or not. Upon receiving a NAK from the receiver, the transmitter typically retransmits the HARQ PPDU using the same bandwidth, MCS and initial scrambling value. Typically, upon retransmitting the HARQ PPDU, the transmitter applies back-off without increasing the Contention Window (CW).

In some embodiments, a WLAN device (AP or STA) uses the High-Throughput Control (HT Control) field in the MAC header of a transmitted frame for transmitting HARQ control information to a remote WLAN device (AP or STA). Depending on the specific IEEE 802.11 variant used in system 20, the HT Control field may comprise, for example, HE-variant HT Control or ETH-variant HT Control.

Non-limiting examples of HARQ control information comprise (i) an instruction to the remote WLAN device to suspend or resume HARQ reception or transmission, (ii) a request to the remote WLAN device to discard a specified HARQ coding unit from the HARQ buffer, and/or (iii) a notification to the remote WLAN device, indicating the available buffer space in the HARQ buffer.

In one example implementation, the HT Control field is divided into three sub-fields for specifying HARQ control information. The first sub-field is denoted "Control ID" and indicates that the following values relate to HARQ control. The second sub-field is denoted "HARQ Control Type" and indicates the type of control information (e.g., suspend/resume, discard HARQ coding unit, HARQ buffer size). The third sub-field is denoted "HARQ Control Info" and specifies related values, e.g., the HARQ ID of a HARQ coding unit to be discarded, or the size of the available HARQ buffer space. Alternatively, any other format can be used for specifying HARQ control information in the HT Control field of the MAC header.

In some embodiments, the Block Acknowledgement (BA) frame specified in IEEE 802.11 is adapted to specify HARQ control information (e.g., HARQ suspend/resume, discard HARQ coding unit, available HARQ buffer size). In an embodiment, the HARQ control information is embedded in the "BA Information" field of the BA frame. The "BA Information" field comprises multiple "Per AID TID Info" sub-fields, one per each <AID,TID> tuple. In one embodiment, an additional "Per AID TID Info" sub-field is added for specifying HARQ control information. This additional field is identified, in an embodiment, by a specific TID value, e.g., TID=13. Following the unique TID, sub-fields such as "HARQ Control Type" and "HARQ Control Info" (both defined above) are added. Alternatively, any other format can be used for specifying HARQ control information in the BA frame.

In some embodiments, AP processor 32 enables and disables HARQ operation, for specific STAs or for all STAs, using the High-Efficiency (HE) Trigger-Based (TB) PPDU feature defined in IEEE 802.11.

Figure 8:
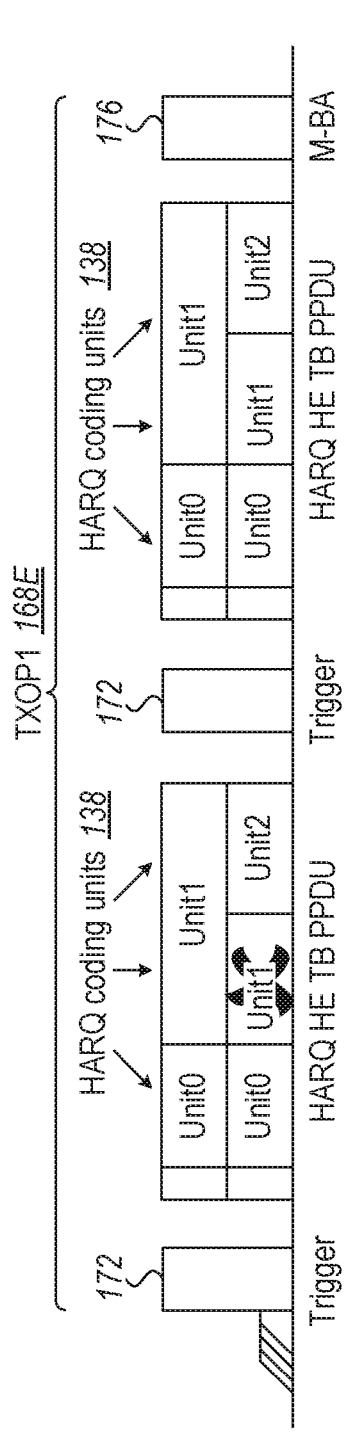
FIG. 8 is a diagram that schematically illustrates HARQ PPDUs solicited by trigger frames, in accordance with an embodiment that is described herein.

FIG. 8 is a diagram that schematically illustrates HARQ PPDUs solicited by trigger frames, in accordance with an embodiment that is described herein. This example refers to HARQ on the uplink channel (in which STA 28 serves as the transmitter and AP 24 serves as the receiver). AP 24 in this example allows EDCA-based medium access for the STAs it serves, and controls the STAs' HARQ operation by using trigger frames. In this embodiment, AP 24, which allows EDCA-based medium access to the STAs, may only allow STA HARQ transmission through HE TB PPDU.

In the embodiment of FIG. 8, within a TXOP 168E, AP 24 begins by sending a trigger frame 172 to two STAs 28. Trigger frame 172 requests the two STAs to transmit respective HARQ PPDUs (in the present case, HARQ HE TB PPDUs). One of the STAs responds with a HARQ PPDU comprising two HARQ coding units 138 denoted Unit0 and Unit1 (shown at the top of the diagram). The other STA responds with a HARQ PPDU comprising three HARQ coding units 138 denoted Unit0, Unit1 and Unit2 (shown at the bottom of the diagram). In this example, Unit1 of the second STA fails to be decoded by the AP, whereas the other HARQ coding units are decoded successfully.

Nevertheless, in the present embodiment AP 24 does not send a Block Acknowledgement (BA) following reception of the two HARQ PPDUs. Instead, AP 24 sends an additional trigger frame 172 to the two STAs 28. This trigger frame requests the STAs to retransmit their respective HARQ PPDUs (not only the failed HARQ coding units). In response, the two STAs retransmit the HARQ PPDUs. Only at this stage, AP 24 transmits a Multi-STA Block Acknowledgement (M-BA) frame 176 to the two STAs.

Figure 9:
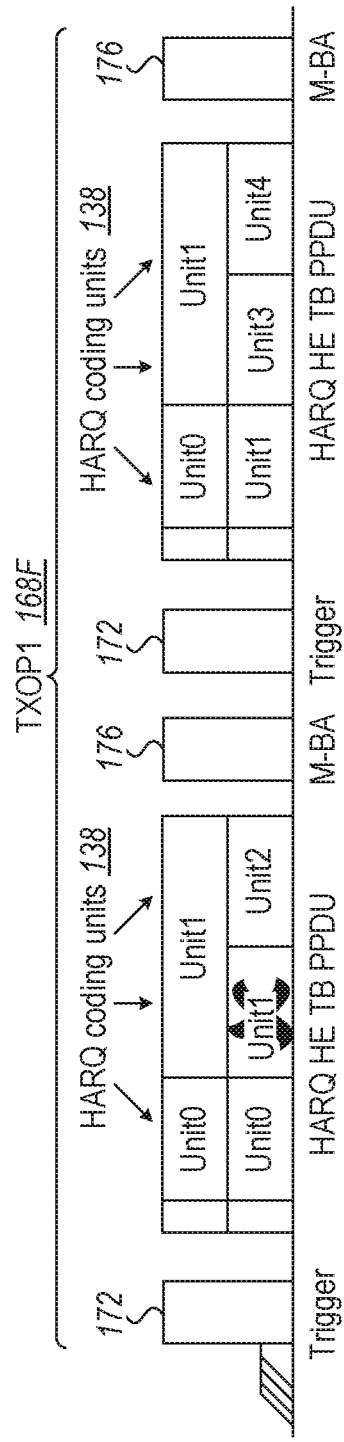
FIG. 9 is a diagram that schematically illustrates HARQ PPDUs solicited by trigger frames, in accordance with an alternative embodiment that is described herein.

FIG. 9 is a diagram that schematically illustrates HARQ PPDUs solicited by trigger frames, in accordance with an alternative embodiment that is described herein. In contrast to the example of FIG. 8, in the present example AP 24 sends a M-BA frame 176 to acknowledge the first HARQ PPDUs sent by the two STAs. Then, AP 24 sends a second trigger frame 172 that (i) requests the second STA to retransmit the entire HARQ PPDU, and (ii) requests the first STA to retransmit only the failed HARQ coding unit (Unit1). The second HARQ PPDU transmitted by the second STA further comprises two new original HARQ coding units denoted Unit3 and Unit4. In the present example, the entire process is performed within the same TXOP 168E.

In some IEEE 802.11 systems, when a WLAN device (AP or STA) transmits a frame, the MAC header comprises a "Duration" field that indicates the remaining time until the end of the current TXOP. In some cases, a PHY SIG field in the PHY header of the frame also comprises a "Duration" value that indicates the remaining time until the end of the current TXOP. The two Duration values (in the MAC header and in the PHY header) may differ in granularity.

In some embodiments, when retransmitting a certain HARQ coding unit, the MAC header of the retransmitted HARQ coding unit is an identical copy of the MAC header of the original HARQ coding unit. Among others, the retransmitted HARQ coding unit has the same MCS, the same scrambling initial value, and the same MPDUs as the original HARQ coding unit. In these embodiments, in the retransmitted HARQ coding unit the PHY header comprises a correct Duration value, but the MAC header comprises an erroneous Duration value. The Duration value in the MAC header of the retransmitted HARQ coding unit is merely a copy of the corresponding value from the original HARQ coding unit, and therefore does not indicate the correct time until the end of the TXOP.

In some embodiments, the receiver (e.g., HARQ processing block 68 in STA processor 52 of STA 28) takes suitable measures that prevents erroneous interpretation of the Duration values in received frames.

In an example embodiment, upon receiving a HARQ PPDU, HARQ processing block 68 extracts the Duration values from the PHY header and from the MAC header, and compares the two Duration values (after normalizing or otherwise compensating for the different granularities). If the Duration values are in agreement, HARQ processing block 68 uses the Duration value from the MAC header. If not, HARQ processing block 68 uses the Duration value from the PHY header, and regards the Duration value from the MAC header as invalid. In the present context, the term "Duration values in agreement with one another" means that the Duration values differ by no more than a predefined time difference, after accounting for the different granularities in which the Duration values are represented in the MAC and PHY headers.

In another embodiment, the transmitter (e.g., HARQ PPDU generator 56 in AP processor 32 of AP 24) assigns a designated field (e.g., bit) in the PHY header to indicate whether a certain HARQ coding unit is an original or retransmitted HARQ coding unit. In this embodiment, upon receiving a HARQ PPDU, HARQ processing block 68 reads this designated field from the PHY header. If, according to the field value, the HARQ coding unit is an original HARQ coding unit, HARQ processing block 68 uses the Duration value from the MAC header. If the field value indicates that the HARQ coding unit is a retransmitted HARQ coding unit, HARQ processing block 68 uses the Duration value from the PHY header, and regards the Duration value from the MAC header as invalid.

Further alternatively, the receiver (e.g., HARQ processing block 68) may use any other suitable criterion for choosing between the Duration value in the PHY header and the Duration value in the MAC header.

In some block, upon receiving a HARQ PPDU, if HARQ processing block 68 identifies two different Duration values in MAC addresses of HARQ coding units in the HARQ PPDU, HARQ processing block 68 uses the smaller of the two Duration values.

In various embodiments, the receiver (e.g., STA processor 52) may use the Duration value for various purposes. Typically, the destined receiver (the receiver to which the HARQ coding unit is addressed) uses the Duration value to calculate the remaining time it has for responding. A neighbor receiver (to which the HARQ coding unit is not addressed) may use the Duration value for setting its Network Allocation Vector (NAV) counter (a counter used to predict the end of the TXOP). Additionally or alternatively, the receiver (destined or neighbor) may use the MAC address in the MAC header to identify the initiator of the HARQ PPDU.

In some embodiments, only the MAC header comprises a Duration value, and the PHY header does not. As explained above, in a retransmitted HARQ coding unit the Duration value in the MAC header may be erroneous because it is merely a copy of the Duration value from the original HARQ coding unit. In absence of a correct Duration value in the PHY header, measures should be taken to predict the end of the TXOP correctly. In some embodiments, the transmitter (e.g., HARQ PPDU generator 56 in AP processor 32 of AP 24) indicates in the PHY header (i) whether the HARQ coding unit is original or retransmitted, and (ii) if retransmitted, a number n indicating the retransmission order (i.e., n=1 for the first retransmission of a HARQ coding unit, n=2 for the second retransmission, and so on). The receiver (e.g., HARQ processing block 68 in STA processor 52 or STA 28) uses this information from the PHY header to estimate the remaining time until the end of the TXOP.

In an example embodiment, for a certain retransmitted HARQ coding unit, the receiver estimates the remaining time until the end of the TXOP as Duration=Duration(MAC)−n·PPDU_LEN−n·SIFS, wherein Duration(MAC) denotes the Duration value extracted from the MAC header, and PPDU_LEN denotes the length of the HARQ PPDU in microseconds. In an alternative embodiment, the receiver may also account for the duration of an additional SIFS and acknowledgement PPDU in the Duration estimation. Further alternatively, any other suitable calculation can be used.

In some embodiments, the transmitter (e.g., HARQ PPDU generator 56) sets a control field to have the same value in the MAC header of an original HARQ coding unit and in the MAC header of the corresponding retransmitted HARQ coding unit. The control field may comprise, for example, a Quality-of-Service (QoS) control field, a High-Throughput (HT) control field, or any other suitable control field. In alternative embodiments, the transmitter permits control fields to have different values in the MAC header of an original HARQ coding unit and in the MAC header of the corresponding retransmitted HARQ coding unit.

Although the embodiments described herein mainly address WLAN systems, the methods and systems described herein can also be used in other applications, such as in other suitable wireless standards.

Certain additional aspects of HARQ operation in WLAN systems are addressed in U.S. Pat. No. 9,876,614, in U.S. patent application Ser. No. 16/667,521, filed Oct. 29, 2019, entitled "Physical Layer (PHY) Data Unit Format for Hybrid Automatic Repeat Request (HARQ)," and in U.S. patent application Ser. No. 16/667,534, filed Oct. 29, 2019, entitled "Method and Apparatus for Generating a Physical Layer (PHY) Data Unit for Hybrid Automatic Repeat Request (HARQ)," which are all assigned to the assignee of the present patent application and whose disclosures are incorporated herein by reference.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for Wireless Local-Area Network (WLAN) communication in a WLAN device, the method comprising:
   receiving from a remote WLAN device an announcement of a maximal Hybrid Automatic Repeat Request (HARQ) buffering capability of a receiver of the remote WLAN device;
   constructing in the WLAN device, in response to the announcement, a HARQ Physical-layer Protocol Data Unit (HARQ PPDU) comprising one or more HARQ coding units, wherein when first and second adjacent MAC Protocol Data Units (MPDUs) in the HARQ PPDU violate a minimum time spacing requirement between adjacent MPDUs, at least an additional HARQ coding unit is inserted between the first and second MPDUs;
   transmitting the HARQ PPDU from the WLAN device to the remote WLAN device, wherein the minimum time spacing requirement defines a minimum time for the remote WLAN device to process the adjacent MPDUs which are transmitted; and
   in response to a request from the remote WLAN device which comprises a list of one or more identifiers, retransmitting one or more of the HARQ coding units, wherein a respective identifier is assigned for each of the HARQ coding units in the HARQ PPDU and the retransmission comprises retransmitting the one or more of the HARQ coding units associated with the identifiers listed in the request.

2. The method of claim 1, wherein the remote WLAN device discards HARQ coding units stored in a HARQ buffer corresponding to the retransmitted HARQ coding units based on determination that a failure to decode the stored HARQ coding units is due to a collision with another transmission.

3. The method according to claim 1, wherein transmitting the HARQ PPDUs comprises:
  transmitting, in a given HARQ coding unit (i) a Physical layer (PHY) header comprising a first duration value indicative or a remaining time in a current transmit opportunity (TXOP), and (ii) a Medium Access Control (MAC) header comprising a second duration value indicative of the remaining time in the current TXOP, where the remote WLAN device in accordance with a predefined selection criterion, selects one of the first and second duration values as a valid duration value.

4. The method according to claim 3, wherein selecting the valid duration value comprises:
  when the second duration value is in agreement with the first duration value, selecting the second duration value provided in the MAC header; and
  when the second duration value is not in agreement with the first duration value, selecting the first duration value provided in the PHY header.

5. The method according to claim 3, wherein selecting the valid duration value comprises: when a designated field in the PHY header indicates that the given HARQ coding unit is not a retransmission, selecting the second duration value provided in the MAC header; and when the designated field in the PHY header indicates that the given HARQ coding unit is a retransmission, selecting the first duration value provided in the PHY header.

6. The method according to claim 1, wherein transmitting the HARQ PPDUs comprises:
  transmitting a first HARQ coding unit having a first Medium Access Control (MAC) header comprising a first duration value indicative of a remaining time in a current transmit opportunity (TXOP);
  transmitting a second HARQ coding unit having a second MAC header comprising a second duration value indicative of the remaining time in the current TXOP; and if the first duration value differs from the second duration value, the remote WLAN device selects a smaller of the first and second duration values as a valid duration value.

7. A Wireless Local-Area Network (WLAN) device, comprising:
  a transceiver configured to transmit and receive WLAN signals to and from a remote WLAN device; and
  a processor, configured to:
    receive from the remote WLAN device an announcement of a maximal Hybrid Automatic Repeat Request (HARQ) buffering capability of a receiver of the remote WLAN device;
    construct, in response to the announcement, a HARQ Physical-layer Protocol Data Unit (HARQ PPDU) comprising one or more HARQ coding units;
    transmit the HARQ PPDU to the remote WLAN device; and
    in response to a request from the remote WLAN device, retransmit one or more of the HARQ coding units; wherein the processor is configured to segment the HARQ PPDU into multiple HARQ coding units by a Physical-layer (PHY) process; and wherein, when first and second adjacent MAC Protocol Data Units (MPDUs) in the HARQ PPDU violate a minimum time spacing requirement between adjacent MPDUs, the processor is configured to insert at least an additional HARQ coding unit between the first and second MPDUs, wherein the minimum time spacing requirement defines a minimum time for the remote WLAN device to process the adjacent MPDUs which are transmitted; the additional HARQ coding unit is received by the remote WLAN device out of order from the one or more HARQ coding units in the HARQ PPDU, a reordering of the additional HARQ coding unit in the one or more HARQ coding units based on an identifier in a signaling field of a PHY header of the HARQ PPDU.

8. The WLAN device of claim 7, wherein the remote WLAN device discards HARQ coding units stored in a HARQ buffer corresponding to the retransmitted HARQ coding units based on determination that a failure to decode the stored HARQ coding units is due to a collision with another transmission.

9. A Wireless Local-Area Network (WLAN) device, comprising:
  a transceiver configured to transmit and receive WLAN signals to and from a remote WLAN device; and
  a processor, configured to:
  receive from the remote WLAN device an announcement of a maximal Hybrid Automatic Repeat Request (HARQ) buffering capability of a receiver of the remote WLAN device;
  construct, in response to the announcement, a HARQ Physical-layer Protocol Data Unit (HARQ PPDU) comprising one or more HARQ coding units;
  transmit the HARQ PPDU to the remote WLAN device; and
  in response to a request from the remote WLAN device which comprises a list of one or more identifiers retransmit one or more of the HARQ coding units; wherein the processor is configured to segment the HARQ PPDU into multiple HARQ coding units by a Physical-layer (PHY) process; and wherein, when first and second adjacent MAC Protocol Data Units (MPDUs) in the HARQ PPDU violate a minimum time spacing requirement between adjacent MPDUs, the minimum time spacing requirement defining a minimum time for the remote WLAN device to process the adjacent MPDUs transmitted which are transmitted, the processor is configured to request the receiver of the remote WLAN device to discard soft-decoding metrics buffered data relating to the second MPDU stored in a HARQ buffer;
  wherein a respective identifier is assigned for each of the HARQ coding units in the HARQ PPDU and the retransmission comprises retransmitting the one or more of the HARQ coding units associated with the identifiers listed in the request.

10. The WLAN device of claim 9, wherein the remote WLAN device discards HARQ coding units stored in a HARQ buffer corresponding to the retransmitted HARQ coding units based on determination that a failure to decode the stored HARQ coding units is due to a collision with another transmission.

11. A Wireless Local-Area Network (WLAN) device, comprising:
  a transceiver configured to transmit and receive WLAN signals to and from a remote WLAN device; and
  a processor, configured to:
    receive from the remote WLAN device an announcement of a maximal Hybrid Automatic Repeat Request (HARQ) buffering capability of a receiver of the remote WLAN device;
    construct, in response to the announcement, a HARQ Physical-layer Protocol Data Unit (HARQ PPDU) comprising one or more HARQ coding units, wherein the constructing comprises embedding in the HARQ coding units one or more MAC Protocol Data Unit (MPDU) delimiters for satisfying a minimum time spacing requirement between adjacent MPDUs in a respective HARQ coding unit;
    transmit the HARQ PPDU to the remote WLAN device, wherein the minimum time spacing requirement defines a minimum time for the remote WLAN device to process the adjacent MPDUs transmitted in the HARQ PPDU; and
    in response to a request from the remote WLAN device, retransmit one or more of the HARQ coding units;
  wherein the processor is configured to assign a respective identifier for each of the HARQ coding units in the HARQ PPDU, to receive in the request a list of one or more identifiers, and to retransmit the one or more of the HARQ coding units associated with the identifiers listed in the request.

12. The WLAN device according to claim 11, wherein the processor comprises at least (i) a HARQ PPDU generator configured to construct the HARQ PPDU and (ii) a transmission chain configured to transmit the HARQ PPDU and retransmit the one or more of the HARQ coding units.

13. The WLAN device according to claim 11, wherein the processor is configured to set a size of the HARQ PPDU to not exceed the maximal HARQ buffering capability announced by the remote WLAN device.

14. The WLAN device according to claim 11, wherein the processor is configured to segment the HARQ PPDU into multiple HARQ coding units by a Medium Access Control (MAC) process.

15. The WLAN device according to claim 11, wherein the processor is configured to segment the HARQ PPDU into multiple HARQ coding units by a Physical-layer (PHY) process.

16. The WLAN device according to claim 11, wherein the processor is configured to receive the announcement of the maximal HARQ buffering capability as part of an association process of the remote WLAN device with the WLAN device.

17. The WLAN device according to claim 11, wherein the processor is configured to receive the announcement of the maximal HARQ buffering capability as part of establishing a HARQ session between the WLAN device and the remote WLAN device.

18. The WLAN device according to claim 11, wherein the processor is configured to embed in the HARQ coding units of the HARQ PPDU only MPDUs sharing a common Traffic Identifier (TID).

19. The WLAN device according to claim 11, wherein the processor is configured to set a number of the HARQ coding units in the HARQ PPDU to deliberately exceed the maximal HARQ buffering capability announced by the remote WLAN device and cause the remote WLAN device to discard some of the HARQ coding units in the HARQ PPDU.

20. The WLAN device according to claim 11, wherein the processor is configured to receive in the request attributes of one or more of the HARQ coding units, and to retransmit the one or more of the HARQ coding units having attributes that match the request.

21. The WLAN device according to claim 11, wherein the processor is configured to transmit the HARQ PPDU, and retransmit the one or more of the HARQ coding units, in a same transmission opportunity (TXOP).

22. The WLAN device according to claim 11, wherein the processor is configured to give precedence to retransmission of the HARQ coding unit over transmission of one or more other HARQ coding units having higher-priority Quality-of-Service (QoS) Access Categories (ACs) than an AC of the retransmitted HARQ coding unit when a backoff counter of the higher priority QoS AC reaches zero.

23. The WLAN device according to claim 11, wherein the processor is configured to trigger transmission of the HARQ PPDU or retransmission of the one or more of the HARQ coding units, and to synchronize to, a trigger frame received from the remote WLAN device.

24. The WLAN device according to claim 11, wherein the processor is configured to set a control field to have a same value in an original transmission of a HARQ coding unit and in a retransmission of the HARQ coding unit.

25. The WLAN device according to claim 24, wherein the control field comprises one or more of (i) a Quality-of-Service (QoS) control field and (ii) a High-Throughput (HT) control field.

* * * * *